(12) United States Patent
Keane et al.

(10) Patent No.: US 10,036,467 B2
(45) Date of Patent: Jul. 31, 2018

(54) AXLE ASSEMBLY HAVING A BALLAST INSERT ASSEMBLY AND A METHOD OF CONTROL

(71) Applicant: ArvinMeritor Technology, LLC, Troy, MI (US)

(72) Inventors: James Keane, West Bloomfield, MI (US); John Kelly, Grosse Pointe Farms, MI (US); Christopher Keeney, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 125 days.

(21) Appl. No.: 14/868,623

(22) Filed: Sep. 29, 2015

(65) Prior Publication Data

US 2017/0089451 A1  Mar. 30, 2017

(51) Int. Cl.
| | |
|---|---|
| *F16H 7/04* | (2006.01) |
| *B60B 35/12* | (2006.01) |
| *B60B 35/16* | (2006.01) |
| *F16H 57/04* | (2010.01) |

(52) U.S. Cl.
CPC ....... *F16H 57/0447* (2013.01); *B60B 35/125* (2013.01); *B60B 35/16* (2013.01); *F16H 57/0423* (2013.01); *F16H 57/0483* (2013.01); *F16H 57/0413* (2013.01); *F16H 2700/00* (2013.01)

(58) Field of Classification Search
CPC ............. F16H 57/0423; F16H 57/0447; F16H 57/0413; F16H 57/0483; F16H 2700/00; F16H 57/0434; F16H 57/0435; F16H 57/037; F16H 57/0421; F16H 57/0424; F16H 57/0441; F16H 57/0443; F16H 57/0449; F16H 57/0456; F16H 57/045; F16H 57/0457; F16H 57/0409; B60B 35/16; B60B 35/125; B60B 35/163; Y10T 74/2189; Y10T 74/2188; Y10T 74/19991; Y10T 74/2186
See application file for complete search history.

(56) References Cited

U.S. PATENT DOCUMENTS

| | | |
|---|---|---|
| 1,966,434 A | 7/1934 | Barker |
| 2,242,195 A | 5/1941 | Teker et al. |
| 4,082,170 A * | 4/1978 | Ritter .................. B62D 55/092 180/340 |

(Continued)

FOREIGN PATENT DOCUMENTS

| | | |
|---|---|---|
| DE | 710894 C | 9/1941 |
| EP | 1375970 A2 | 1/2004 |

(Continued)

OTHER PUBLICATIONS

United States Patent and Trademark Office, U.S. Appl. No. 14/696,542, filed Apr. 27, 2015.

(Continued)

*Primary Examiner* — Daniel D Yabut
(74) *Attorney, Agent, or Firm* — Brooks Kushman P.C.

(57) ABSTRACT

An axle assembly having a ballast insert assembly and a method of control. The ballast insert assembly may have an inflatable bladder that may be disposed in a cavity. The volume of lubricant in the cavity may be greater when the inflatable bladder is deflated than when the inflatable bladder is inflated.

19 Claims, 6 Drawing Sheets

(56) References Cited

U.S. PATENT DOCUMENTS

| | | | |
|---|---|---|---|
| 4,526,054 A | 7/1985 | Ehrlinger | |
| 4,736,819 A | 4/1988 | Muller | |
| 5,505,112 A | 4/1996 | Gee | |
| 5,540,300 A | 7/1996 | Downs et al. | |
| 5,558,591 A * | 9/1996 | Erickson | F16H 57/0447 184/6.12 |
| 5,839,327 A | 11/1998 | Gage | |
| 6,132,329 A | 10/2000 | Tison | |
| 6,299,561 B1 * | 10/2001 | Kramer | F16H 57/0447 184/13.1 |
| 6,938,731 B2 | 9/2005 | Slesinski | |
| 8,858,381 B2 | 10/2014 | Trost | |
| 8,974,342 B2 | 3/2015 | Kwasniewski et al. | |
| 8,984,871 B1 | 3/2015 | Probst | |
| 2015/0219206 A1 | 8/2015 | Trost | |
| 2016/0046150 A1 * | 2/2016 | Kelly | B60B 35/125 156/60 |

FOREIGN PATENT DOCUMENTS

| | | |
|---|---|---|
| EP | 2660493 A1 | 11/2013 |
| EP | 3098479 A2 | 11/2016 |
| GB | 2180603 A | 4/1987 |
| JP | S5937462 U | 3/1984 |
| JP | 2012210839 A | 11/2012 |

OTHER PUBLICATIONS

United States Patent and Trademark Office, U.S. Appl. No. 14/853,309, filed Sep. 14, 2015.

European Patent Office, Extended European Search Report for the corresponding European Patent Application No. 16182684.7 dated Apr. 4, 2017.

Australia Government, IP Australia, Examination Report for the corresponding Australian Patent Application No. 2016210763 dated Mar. 31, 2017.

* cited by examiner

AXLE ASSEMBLY HAVING A BALLAST INSERT ASSEMBLY AND A METHOD OF CONTROL

TECHNICAL FIELD

This disclosure relates to an axle assembly that has a ballast insert assembly that may include an inflatable bladder and a method of control.

BACKGROUND

An axle assembly lubrication apparatus is disclosed in U.S. Pat. No. 6,132,329.

SUMMARY

In at least one embodiment, an axle assembly is provided. The axle assembly may include an axle housing and a ballast insert assembly. The axle housing may have a center portion that may receive a differential. The ballast insert assembly may be disposed in the center portion below the differential. The ballast insert assembly may include a body and an inflatable bladder. The body may have a lubricant port and may at least partially define a cavity. The inflatable bladder may be disposed in the cavity. A volume of lubricant in the cavity may be greater when the inflatable bladder is deflated than when the inflatable bladder is inflated.

In at least one embodiment, a method of controlling an axle assembly is provided. The method may include providing an axle housing that may receive a differential and a ballast insert assembly. The ballast insert assembly may have an inflatable bladder that may be disposed in a cavity. The inflatable bladder may be deflated to allow lubricant to enter the cavity via a lubricant port to reduce a volume of lubricant in a sump portion of the axle housing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
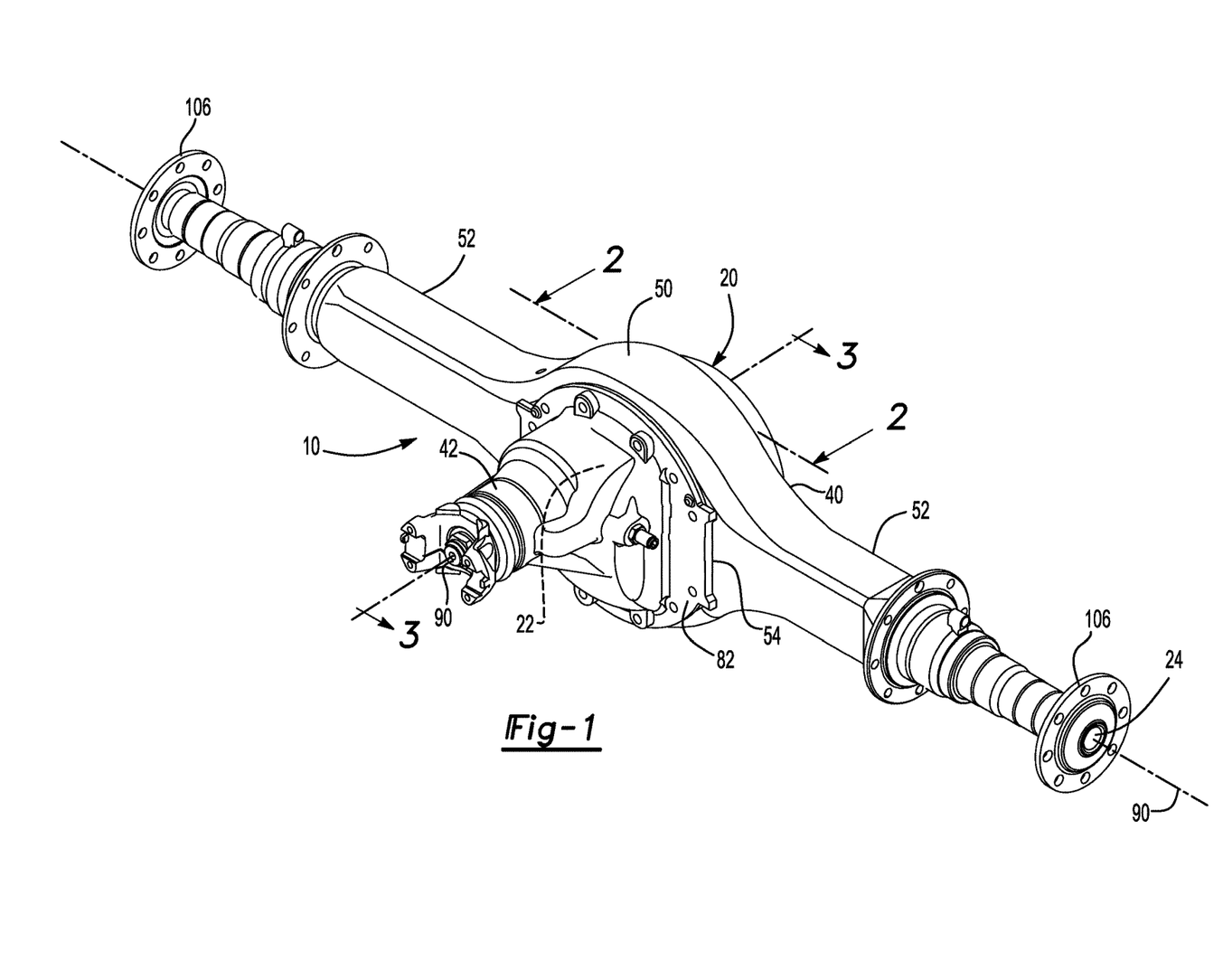
FIG. 1 is a perspective view of an axle assembly.

Referring to FIG. 1, an exemplary axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. As is best shown with reference to FIGS. 1-3, the axle assembly 10 may include a housing assembly 20, a differential 22, at least one axle 24, a ballast insert assembly 26, a pressurized fluid supply subsystem 28, and a controller 30.

The housing assembly 20 may receive various components of the axle assembly 10. In addition, the housing assembly 20 may facilitate mounting of the axle assembly 10 to the vehicle. The housing assembly 20 may include an axle housing 40 and a differential carrier 42.

The axle housing 40 may receive and support the axles 24. In at least one embodiment, the axle housing 40 may include a center portion 50, at least one arm portion 52, and a carrier housing mounting surface 54.

Figure 2:
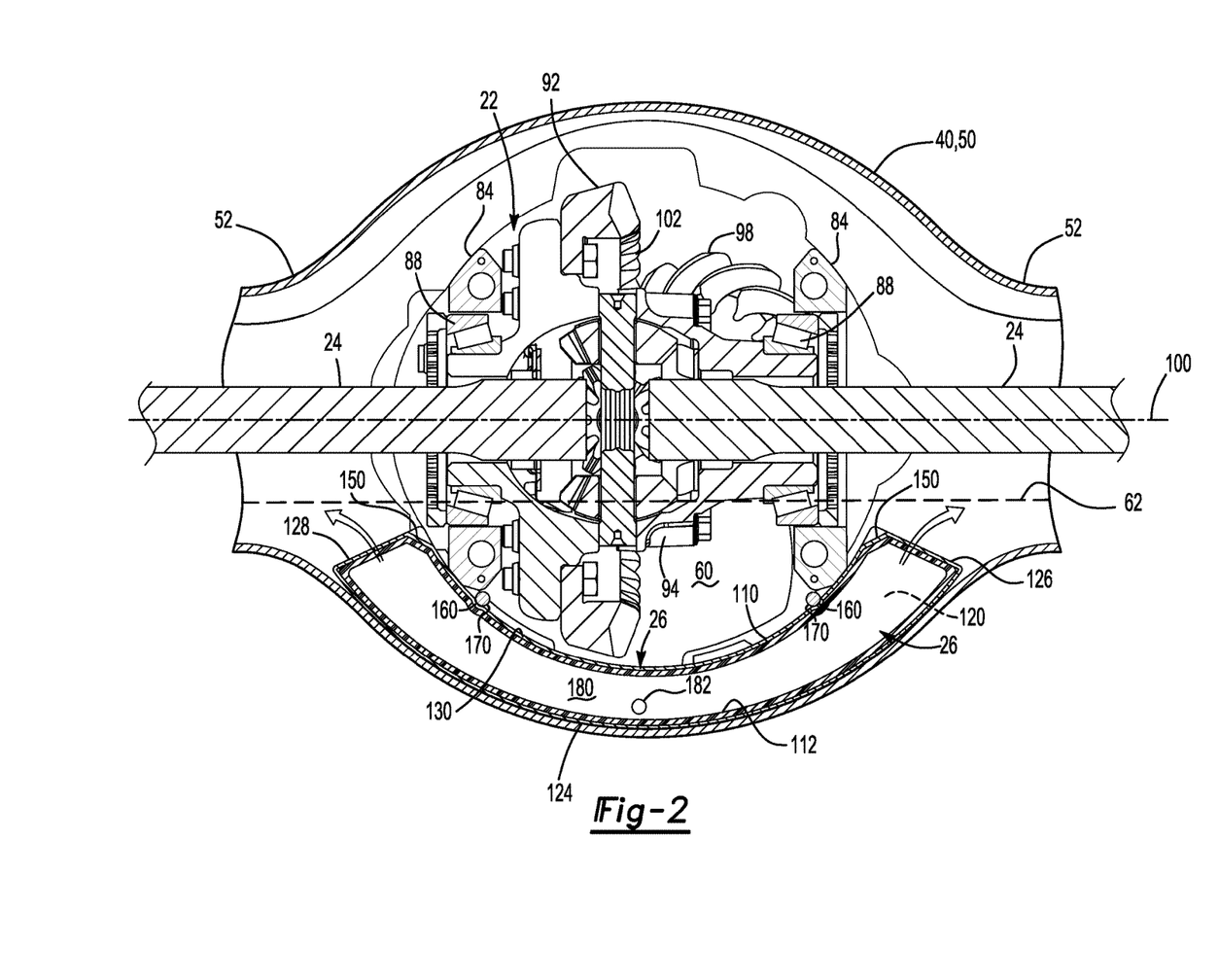
FIG. 2 is a section view of the axle assembly along section line 2-2 showing a ballast insert assembly with an inflatable bladder in an inflated condition.

The center portion 50 may be disposed proximate the center of the axle housing 40. The center portion 50 may at least partially define a cavity that may receive the differential 22 and the ballast insert assembly 26. As is best shown in FIG. 2, a region of the center portion 50 or cavity located below the differential 22 and above or outside of the ballast insert assembly 26 may at least partially define a sump portion 60 that may contain lubricant 62. Splashed lubricant may flow down the sides of the center portion 50 and may flow over internal components of the axle assembly 10 and gather in the sump portion 60. The lubricant 62, which may be a liquid such as oil, may lubricate components of the axle assembly 10, such as the differential 22 and various bearings. In FIG. 2, the level of the lubricant 62 is merely exemplary; the lubricant 62 may fill more or less of the center portion 50 of the axle housing 40 and may substantially or completely submerge the ballast insert assembly 26 under various operating conditions.

Figure 3:
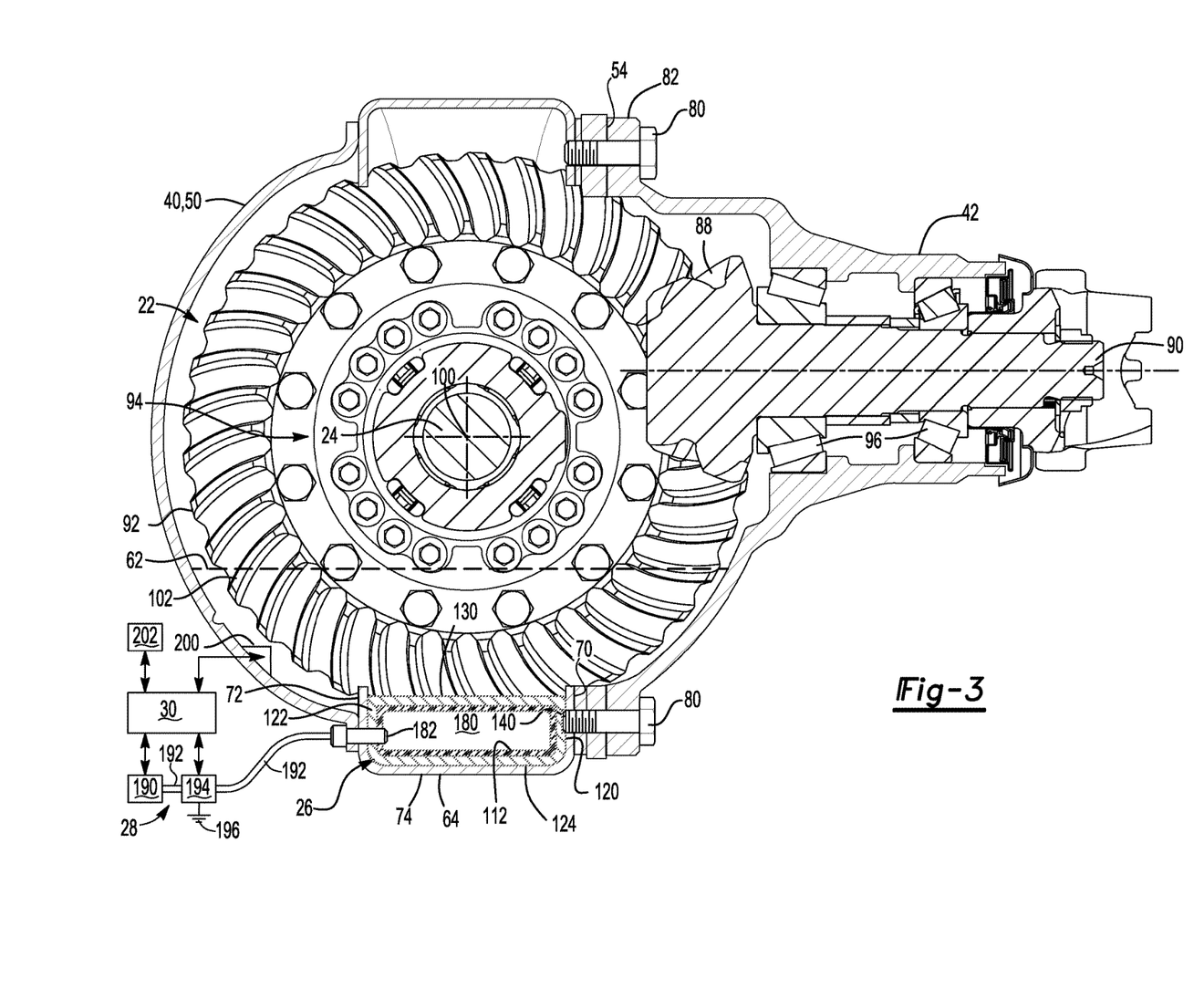
FIG. 3 is a section view of the axle assembly of FIG. 2 along section line 3-3.

Referring to FIG. 3, the center portion 50 may have a housing trench 64 that may receive and position the ballast insert assembly 26. The housing trench 64 may extend along the bottom of the center portion 50 and may be configured as a recess that may be disposed below the differential 22 and that may extend away from the differential 22. The housing trench 64 may extend between the arm portions 52 and may be disposed directly below the differential 22 and axles 24. In at least one embodiment, the housing trench 64 may have a first housing trench side wall 70, a second housing trench side wall 72, and a housing trench bottom wall 74.

The first housing trench side wall 70 may be disposed proximate and may engage the differential carrier 42. The first housing trench side wall 70 may also facilitate mounting of the differential carrier 42. For instance, the first housing trench side wall 70 may have a set of holes that may be aligned with corresponding holes on the differential carrier 42. These holes may receive a corresponding fastener 80, such as a bolt, that may couple the differential carrier 42 to the axle housing 40.

The second housing trench side wall 72 may be disposed opposite the first housing trench side wall 70. In addition, the second housing trench side wall 72 may be completely spaced apart from the first housing trench side wall 70.

The housing trench bottom wall 74 may extend from the first housing trench side wall 70 to the second housing trench side wall 72. The housing trench bottom wall 74 may at least partially define a bottom surface of the axle housing 40.

Referring to FIG. 1, one or more arm portions 52 may extend from the center portion 50. For example, two arm portions 52 may extend in opposite directions from the center portion 50 and away from the differential 22. The arm portions 52 may have substantially similar configurations. For example, the arm portions 52 may each have a hollow configuration or tubular configuration that may extend around the corresponding axle 24 and may help separate or isolate the axle 24 from the surrounding environment. An arm portion 52 or a portion thereof may be integrally formed with the center portion 50 in one or more embodiments. Each arm portion 52 may define an arm cavity that may receive a corresponding axle 24. The arm portion 52 and arm cavity may be disposed above the sump portion 60 in one or more embodiments.

Referring to FIGS. 1 and 3, the carrier housing mounting surface 54 may face toward and may engage the differential carrier 42. The carrier housing mounting surface 54 may facilitate mounting of the differential carrier 42 to the axle housing 40. For example, the carrier housing mounting surface 54 may have a set of holes that may be aligned with corresponding holes on the differential carrier 42. Each hole may receive a fastener 80, such as a bolt, that may couple the differential carrier 42 to the axle housing 40.

The differential carrier 42, which may also be called a carrier housing, may be mounted to the center portion 50 of the axle housing 40. The differential carrier 42 may support components of the differential 22. In at least one embodiment, the differential carrier 42 may have a flange portion 82 and a bearing support 84.

The flange portion 82 may facilitate mounting of the differential carrier 42 to the axle housing 40. For example, the flange portion 82 may be disposed proximate and may engage the carrier housing mounting surface 54 of the axle housing 40 and may have a set of holes that may receive fasteners 80 as previously discussed.

Referring to FIG. 2, a bearing support 84 may receive a roller bearing assembly 88 that may rotatably support the differential 22. In FIG. 2, two bearing supports 84 are shown that are located inside the center portion 50 on opposite sides of the differential 22. A bearing support 84 may include a pair of legs that extend from the differential carrier 42 and a bearing cap that may be mounted to the legs and that may arch over a roller bearing assembly 88. The legs and bearing cap may extend around the roller bearing assembly 88 and may cooperate to receive and secure the roller bearing assembly 88.

Referring to FIGS. 2 and 3, the differential 22 may be disposed in the housing assembly 20. The differential 22 may transmit torque to the vehicle traction wheel assemblies and permit the traction wheel assemblies to rotate at different velocities. An input shaft 90, a ring gear 92, and a differential unit 94 are shown to facilitate an abbreviated discussion of the operation of the axle assembly 10 and differential 22.

The input shaft 90 may be coupled to a vehicle drivetrain component, such as a drive shaft, that may be coupled to an output of a vehicle transmission or transfer case, which in turn may receive torque from a vehicle power source, such as an engine or motor. Alternatively, the input shaft 90 may be operatively connected to an output of another axle assembly. As is best shown in FIG. 3, the input shaft 90 may be rotatably supported by one or more roller bearings 96 that may be disposed in the differential carrier 42 and may be operatively connected to a drive pinion 98. The drive pinion 98 may provide torque to the ring gear 92.

The ring gear 92 may transmit torque the differential unit 94. For instance, the ring gear 92 may be mounted to or may be operatively connected to the differential unit 94. The ring gear 92 may rotate about an axis 100 and may have a set of teeth 102 that may arranged around the axis 100. The ring gear 92 may splash lubricant that accumulates in the sump portion 60 as it rotates.

The differential unit 94 may be generally disposed in the center portion 50 of the axle housing 40 and may be configured to permit the axles 24 to rotate at different speeds. As is best shown in FIG. 2, the differential unit 94 may be rotatably supported by a pair of roller bearing assemblies 88 and may be connected to the axles 24. As such, the differential unit 94 may receive torque via the ring gear 92 and provide torque to the axles 24.

The axles 24 may transmit torque from the differential 22 to corresponding traction wheel assemblies. In FIG. 2, two axles 24 are provided such that each axle 24 extends through a different arm portion 52. The axles 24 may extend along and may be rotated about the axis 100 by the differential 22. Each axle 24 may have a first end and a second end. The first end may be operatively connected to the differential 22. The second end may be disposed opposite the first end and may be located outside of the arm portion 52 of the axle housing 40. As shown in FIG. 1, an axle flange 106 may be disposed proximate the second end of the axle 24 and may facilitate mounting of a wheel end assembly and traction wheel assembly.

Figures 6, 7:
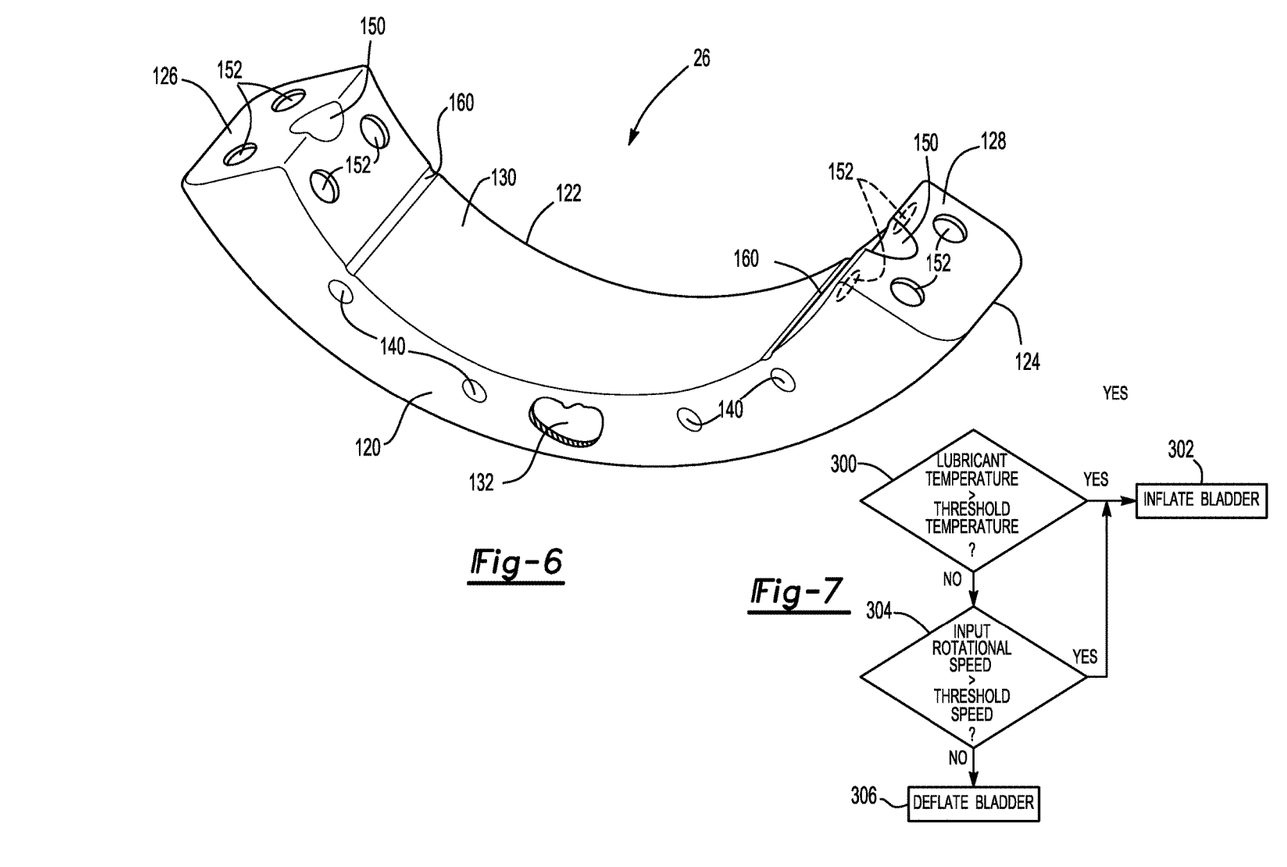
FIG. 6 is a perspective view of the ballast insert assembly.
FIG. 7 is a flowchart of an exemplary method of control of the axle assembly and ballast insert assembly.

Referring to FIGS. 2, 3 and 6, the ballast insert assembly 26 may be disposed in the center portion 50 below the differential 22. The ballast insert assembly 26 may at least partially fill the housing trench 64 and may help control the volume of lubricant 62 in the sump portion 60, which may be located above and outside of the ballast insert assembly 26. Reducing the volume of lubricant 62 in the sump portion 60 may reduce churning losses or frictional drag that may be exerted upon the ring gear 92 by the lubricant 62 and may improve operating efficiency of the axle assembly 10 and vehicle fuel economy. The term ballast insert assembly employs the word "ballast" primarily with reference to its location at the bottom of the housing assembly 20 and that it fills in at least a portion of the bottom of the housing assembly 20 or housing trench 64, rather than in the context of ballast that provides stability. In at least one embodiment, the ballast insert assembly 26 may have a body 110 and an inflatable bladder 112.

The body 110 may be configured as a hollow tank that may selectively receive or store lubricant. The body 110 may be made of any suitable material. For example, the body 110 may be made of a metal alloy or a polymeric material, which may allow the ballast insert assembly 26 to be formed into complex shapes and may help reduce cost and weight. As is best shown in FIG. 2, the body 110 may be spaced apart from the ring gear 92.

The body 110 may be provided in various configurations. As is best shown in FIG. 6, the body 110 may include a first side wall 120, a second side wall 122, a lower wall 124, a first end wall 126, a second end wall 128, an upper wall 130, and a cavity 132.

The first side wall 120 may face toward and may engage the first housing trench side wall 70 of the housing trench 64 as is best shown in FIG. 3. As is best shown in FIG. 6, the first side wall 120 may have one or more indentations 140 that may extend toward the second side wall 122. Each indentation 140 may receive an end of a corresponding fastener 80 that may extend through the first housing trench side wall 70. The indentations 140 may be configured as blind holes and may be disposed between and may be spaced apart from the lower wall 124 and a surface disposed opposite the lower wall 124, such as the upper wall 130. The indentations 140 may be omitted in one or more embodiments.

The second side wall 122 may be disposed opposite the first side wall 120. The second side wall 122 may face toward and may engage the second housing trench side wall 72 of the housing trench 64 as is best shown in FIG. 3. As such, the ballast insert assembly 26 may extend from the first housing trench side wall 70 to the second housing trench side wall 72. The second side wall 122 may be disposed substantially parallel to the first side wall 120 in one or more embodiments.

The lower wall 124 may extend from the first side wall 120 to the second side wall 122. The lower wall 124 may be disposed on the center portion 50. For example, the lower wall 124 may be disposed on the housing trench bottom wall 74 of the housing trench 64 as is best shown in FIG. 3. As is best shown in FIG. 2, the lower wall 124 may extend along an arc and may follow the contour of the housing trench bottom wall 74.

The first end wall 126 may be disposed at a first end of the ballast insert assembly 26. The first end wall 126 may extend from a first end of the lower wall 124 to a first end of the upper wall 130. The first end wall 126 may also extend from the first side wall 120 to the second side wall 122. A lubricant trough 150 may be associated with the first end wall 126. The lubricant trough 150 may help direct lubricant from the first end wall 126 toward the ring gear 92. The lubricant trough 150 may be configured as a recess that may be disposed in the first end wall 126 and may extend from the first end wall 126 to the upper wall 130. In addition, one or more lubricant ports 152 may be provided in the first end wall 126. In FIG. 6, two lubricant ports 152 are shown that are spaced apart from each other; however it is contemplated that a greater or lesser number of lubricant ports may be provided. The lubricant port(s) 152 in the first end wall 126 may direct lubricant into a first arm portion 52 of the axle housing 40 when the inflatable bladder 112 is inflated. It is also contemplated that the first end wall 126 may be provided without lubricant ports 152 in one or more embodiments. In addition, it is also contemplated that the first end wall 126 may be omitted, in which case the first end of the ballast insert assembly 26 effectively becomes a lubricant port 152.

The second end wall 128 may be disposed opposite the first end wall 126. The second end wall 128 may be disposed at a second end of the ballast insert assembly 26. The second end wall 128 may extend from a second end of the lower wall 124 to a second end of the upper wall 130. The second end wall 128 may also extend from the first side wall 120 to the second side wall 122. A lubricant trough 150 may also be associated with the second end wall 128. The lubricant trough 150 may help direct lubricant from the second end wall 128 toward the ring gear 92. The lubricant trough 150 may be configured as a recess that may be disposed in the second end wall 128 and may extend from the second end wall 128 to the upper wall 130. In addition, one or more lubricant ports 152 may be provided in the second end wall 128. In FIG. 6, two lubricant ports 152 are shown that are spaced apart from each other; however it is contemplated that a greater or lesser number of lubricant ports may be provided. The lubricant port(s) 152 in the second end wall 128 may direct lubricant into a second arm portion 52 of the axle housing 40 when the inflatable bladder 112 is inflated. It is also contemplated that the second end wall 128 may be provided without lubricant ports 152 in one or more embodiments. In addition, it is also contemplated that the second end wall 128 may be omitted, in which case the second end of the ballast insert assembly 26 effectively becomes a lubricant port 152.

The upper wall 130 may face toward the differential 22. The upper wall 130 may extend from the first end wall 126 to the second end wall 128. The upper wall 130 may also extend from the first side wall 120 to the second side wall 122. In addition, one or more lubricant ports 152 may be provided in the upper wall 130. In FIG. 6, two lubricant ports 152 are shown near the first and second ends of the ballast insert assembly 26; however it is contemplated that a greater or lesser number of lubricant ports may be provided. It is also contemplated that the upper wall 130 may be provided without lubricant ports 152 in one or more embodiments.

The upper wall 130 may include a groove 160 that may extend toward the lower wall 124. The groove 160 may extend from the first side wall 120, the second side wall 122, or both. In FIG. 6, the groove 160 extends from the first side wall 120 to the second side wall 122. The groove 160 may extend in a substantially linear manner from the first side wall 120 to the second side wall 122 in one or more embodiments.

The cavity 132 may be defined inside of the body 110. For instance, the cavity 132 may be defined by the first side wall 120, second side wall 122, lower wall 124, upper wall 130, and first and second end walls 126, 128, if provided. The cavity 132 may receive the inflatable bladder 112. In addition, the cavity 132 may receive a variable volume of lubricant 62 depending on the inflation condition of the inflatable bladder 112.

The body 110 may be secured to the housing assembly 20 in various ways. The following are some examples of how the body 110 may be secured. These examples may be employed individually or in any combination.

First, the body 110 may be secured to the housing assembly 20 via friction or an interference fit.

Second, the body 110 may be secured to the housing assembly 20 with an adhesive or other bonding agent.

Third, one or more fasteners may secure the body 110 to the axle housing 40. As is best shown in FIG. 2, a fastener 170 may be received in a groove 160 of the body 110. Such a fastener 170 may extend from the first housing trench side wall 70 of the housing trench 64, the second housing trench side wall 72 of the housing trench 64, or from the first and second housing trench side walls 70, 72. As is best shown in FIG. 3, one or more fasteners 80 that are used to mount the differential carrier 42 to the axle housing 40 may secure the ballast insert assembly 26. For instance, one or more fasteners 80 may be received in a corresponding indentation 140 to inhibit movement of the ballast insert assembly 26.

Fourth, one or more bearing supports 84 may secure the body 110 to the axle housing 40. A bearing support 84 may engage an adjacent surface of the body 110. For instance, a first and second bearing supports 84 may engage the upper wall 130 as is best shown in FIG. 2.

Referring to FIGS. 2 and 3, the inflatable bladder 112 may be received in the cavity 132 of the body 110 of the ballast insert assembly 26. For instance, the inflatable bladder 112 may be disposed inside the body 110 between the first side wall 120 and the second side wall 122, between the lower wall 124 and the upper wall 130, and between the first end wall 126 and the second end wall 128. The inflatable bladder 112 may be made of any suitable material, such as a flexible material like a polymeric material or rubber. The inflatable bladder 112 may have a chamber 180 and a port 182.

The chamber 180 may be disposed inside the inflatable bladder 112.

The port 182 may allow pressurized fluid to enter or exit the chamber 180. For example, the inflatable bladder 112 may be fluidly connected to the pressurized fluid supply subsystem 28 via a port 182. Providing pressurized fluid to the chamber 180 may inflate the inflatable bladder 112 such that the inflatable bladder 112 may increase in volume and force lubricant 62 out of the cavity 132 of the body 110 via one or more lubricant ports 152 as is represented by the arrowed lines at each end of the ballast insert assembly 26 in FIG. 2. Expelling lubricant from the cavity 132 may reduce the volume of lubricant 62 in the cavity 132 and may increase the volume of lubricant 62 in the sump portion 60 that may be available to help lubricate and cool components of the axle assembly 10. The inflatable bladder 112 may engage multiple walls of the body 110 and may substantially fill the cavity 132 when in an inflated condition as is best shown in FIGS. 2 and 3.

Figure 4:
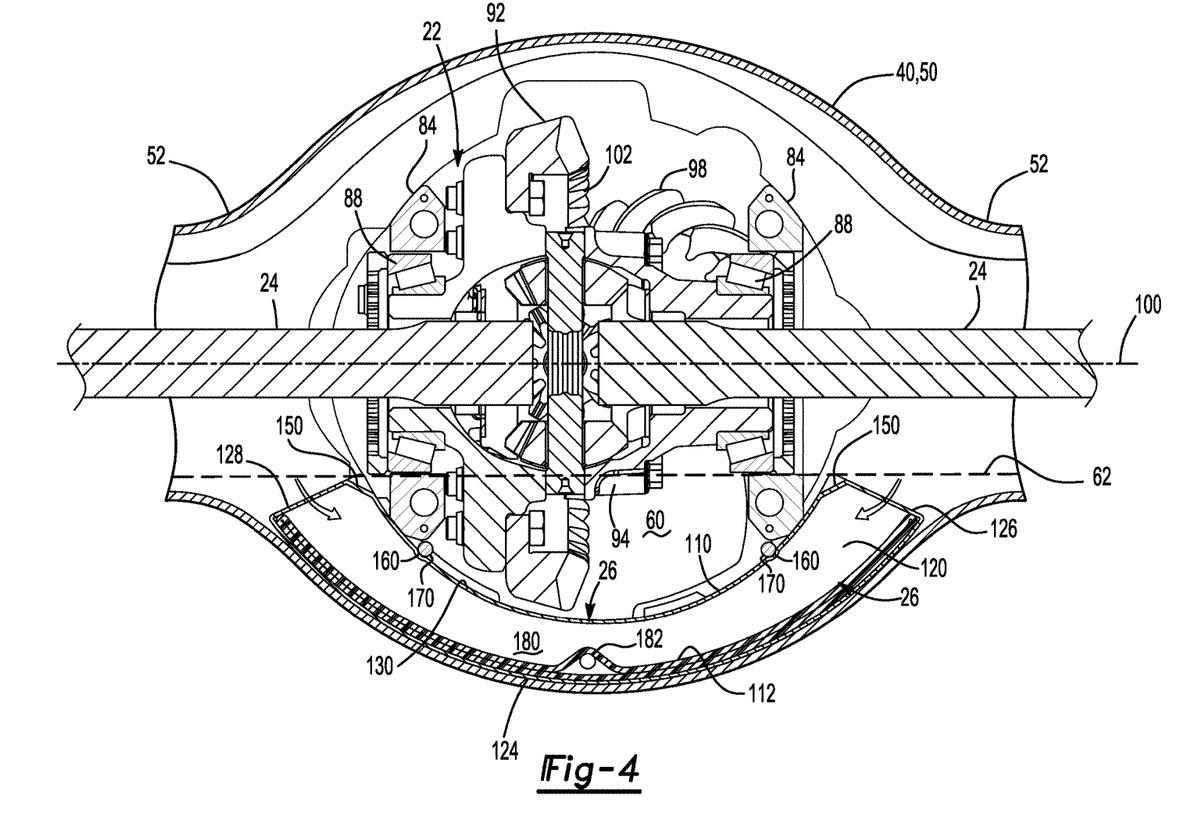
FIG. 4 is a section view of the axle assembly along section line 2-2 showing the inflatable bladder in a deflated condition.
Figure 5:
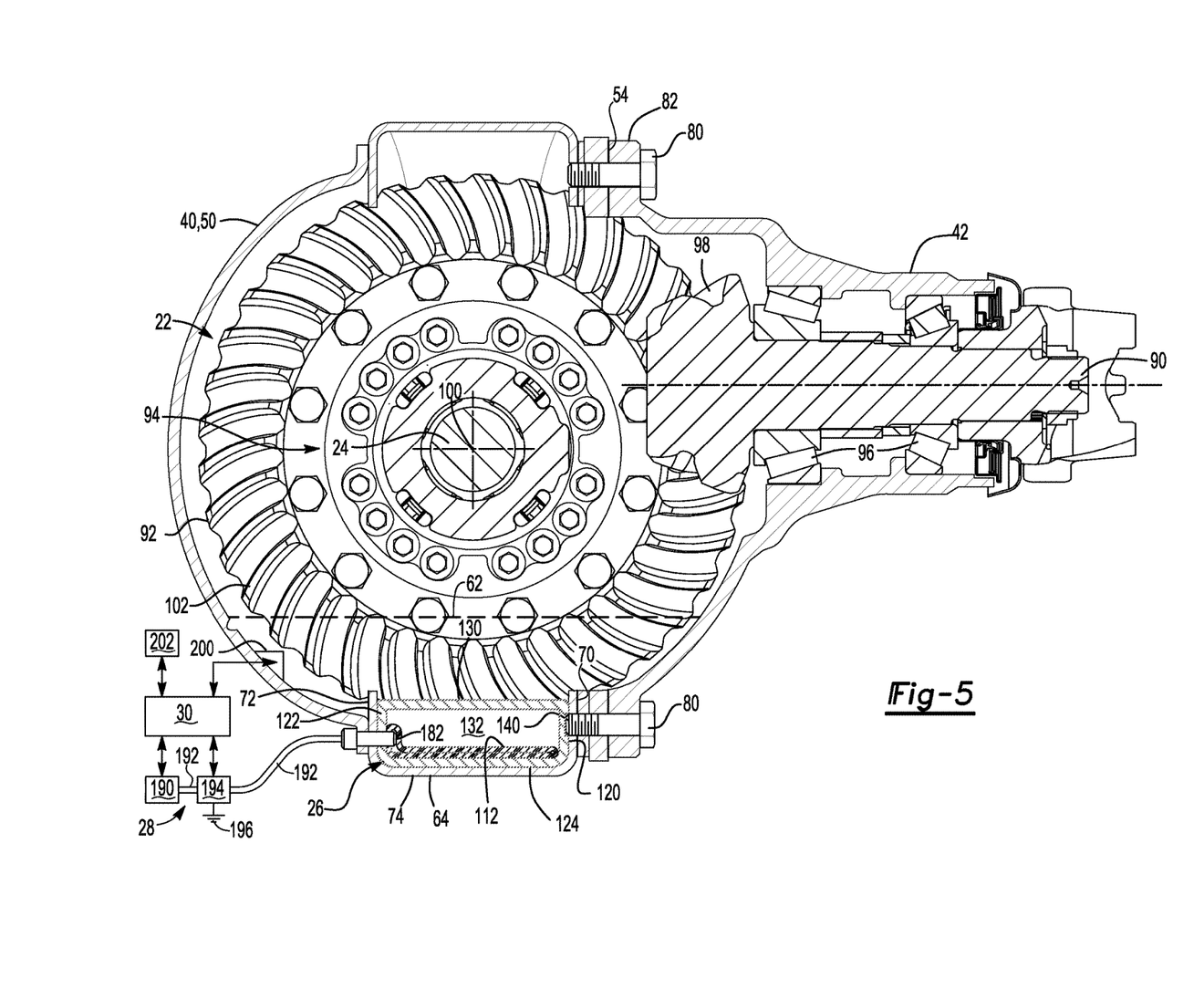
FIG. 5 is a section view of the axle assembly of FIG. 4.

Removing pressurized fluid from the chamber 180 of the inflatable bladder 112 or decreasing the volume of pressurized fluid in the chamber 180 may reduce pressure inside the inflatable bladder 112, thereby allowing the inflatable bladder 112 to deflate or decrease in volume and allow lubricant to enter the body 110 via one or more lubricant ports 152 as is represented by the arrowed lines at each end of the ballast insert assembly 26 in FIG. 4. As such, deflating the inflatable bladder 112 may increase the volume of lubricant 62 in the cavity 132 may decrease the volume of lubricant in the sump portion 60. In addition, the volume of lubricant 62 in the cavity 132 may be greater when the inflatable bladder 112 is deflated than when the inflatable bladder 112 is inflated. The inflatable bladder 112 may not substantially fill the cavity 132 and may disengage one or more walls of the body 110 when in a deflated condition as is best shown in FIGS. 4 and 5. For instance, the inflatable bladder 112 may rest on the lower wall 124 and may move away from the upper wall 130 and may disengage or may be spaced apart from the upper wall 130 when in the deflated condition.

Referring to FIG. 3, the pressurized fluid supply subsystem 28 may control inflation and deflation of the inflatable bladder 112. The pressurized fluid supply subsystem 28 may include a pressurized fluid source 190, one or more conduits 192, and at least one valve 194.

The pressurized fluid source 190 may be configured to supply a volume of a pressurized fluid that may be used to inflate the inflatable bladder 112. For instance, the pressurized fluid may be a gas, such as air, or may be a liquid. In at least one embodiment, the pressurized fluid source 190 may include a tank and/or a pump like a compressor that may be disposed on the vehicle and driven by a vehicle engine or vehicle power source.

One or more conduits 192, such as a hose, tubing, pipe, or combinations thereof, may fluidly connect the pressurized fluid source 190 to the valve 194 and the inflatable bladder 112. For example, a conduit 192 may fluidly connect the pressurized fluid source 190 the valve 194 and another conduit 192 may fluidly connect the valve 194 to the port 182 of the inflatable bladder 112.

One or more valves 194 may enable or disable the flow of pressurized fluid from the pressurized fluid source 190 to the inflatable bladder 112. Operation of the valve 194 may be controlled by the controller 30. For instance, the valve 194 may include or may be controlled by an actuator, such as solenoid, that may actuate the valve 194 between a first position and a second position. In the first position, pressurized fluid may be provided to the inflatable bladder 112. For instance, pressurized fluid may flow from the pressurized fluid source 190 to the inflatable bladder 112 via one or more conduits 192 when the valve 194 is in the first position. In the second position, pressurized fluid may be vented from the inflatable bladder 112. For instance, pressurized fluid may flow from the inflatable bladder 112 and may be vented to the surrounding environment via a vent port 196 when the valve 194 is in the second position. Moreover, pressurized fluid may not flow from the pressurized fluid source 190 to the inflatable bladder 112 when the valve 194 is in the second position. It is also contemplated that multiple valves may be provided. For example, a first valve may control inflation of the inflatable bladder 112 while a second valve may control venting of the inflatable bladder 112. In at least one embodiment, the valve 194 may normally be in the first position under predetermined operating conditions, such as when the vehicle is not operational or turned off or when the vehicle engine is not running.

One or more electronic control modules or controllers 30 may be provided to monitor and control various components associated with the axle assembly 10. The controller 30 may be electrically connected to or may communicate with components of the axle assembly 10 and pressurized fluid supply subsystem 28. For example, the controller 30 may be configured to control actuation of the one or more valves 194 to control the flow of pressurized fluid with respect to the inflatable bladder 112. In FIG. 3, communication between the controller 30 and these components is represented by double arrowed lines. The controller 30 may also process input signals or data from various input devices, such as sensors like a temperature sensor 200 and a speed sensor 202.

The temperature sensor 200 may be disposed in the axle housing 40 and may be configured to detect or provide a signal indicative of a temperature of lubricant 62 in the axle housing 40. For example, the temperature sensor 200 may detect the temperature of lubricant 62 in the sump portion 60.

The speed sensor 202 may be provided to detect or provide data indicative of the rotational speed associated with an input to the axle assembly 10, such as the rotational speed of the input shaft 90 or a vehicle drivetrain component that rotates or provides torque to the input shaft 90, such as a driveshaft, output shaft of another axle assembly or transmission. In addition, the speed sensor may be indicative of an engine speed. The speed sensor 202 may be of any suitable type.

Referring to FIG. 7, a flowchart of an exemplary method of control of the axle assembly 10 and the ballast insert assembly 26 is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

The flowchart in FIG. 7 shows examples of controlling inflation and deflation of the inflatable bladder 112 based on temperature and speed; however, it is contemplated that inflation and deflation control may be based on temperature alone or speed alone. In addition, it is contemplated that other inputs, such as vehicle speed or a propulsion torque command may supplement temperature or speed.

At block 300, the method may determine whether a lubricant temperature is greater than a threshold temperature value. The lubricant temperature may be based on a signal from the temperature sensor 200. The threshold temperature value may be established based on vehicle development testing. If the lubricant temperature exceeds the threshold temperature value, then the method may continue at block 302. If the lubricant temperature does not exceed the threshold temperature value, then the method may continue at block 304 or at block 306 if block 304 is omitted.

At block 302, the inflatable bladder 112 may be inflated. The inflatable bladder 112 may be inflated by providing pressurized fluid to the inflatable bladder 112. For example, the controller 30 may actuate the valve 194 to the first position to allow pressurized fluid to enter and inflate the inflatable bladder 112. Inflating the inflatable bladder 112 from a deflated condition may cause the inflatable bladder 112 to expand in the cavity 132 of the body 110 and force lubricant out of the ballast insert assembly 26, which may increase the volume of lubricant in the sump portion 60 as previously discussed.

At block 304, the method may determine whether an input rotational speed is greater than a threshold speed value. The input rotational speed may be based on a signal from the speed sensor 202. The threshold speed value may be established based on vehicle development testing. If the input rotational speed exceeds the threshold speed value, then the method may continue at block 302. If the input rotational speed does not exceed the threshold speed value, then the method may continue at block 306.

At block 306, the inflatable bladder 112 may be deflated. The inflatable bladder 112 may be deflated by venting pressurized fluid from the inflatable bladder 112. For example, the controller 30 may actuate the valve 194 to the second position to allow pressurized fluid to exit from the inflatable bladder 112. Deflating the inflatable bladder 112 from the inflated condition may cause the inflatable bladder 112 to contract in the cavity 132 of the body 110 and allow lubricant to enter the ballast insert assembly 26, which may decrease the volume of lubricant in the sump portion 60 as previously discussed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an axle housing that has a center portion that receives a differential; and
   a ballast insert assembly disposed in the center portion below the differential, wherein the ballast insert assembly includes:
   a body that at least partially defines a cavity and that has a lower wall, an upper wall disposed opposite the lower wall, first and second end walls that are disposed opposite each other, disposed in a nonparallel relationship, and that extend from the lower wall to the upper wall, and a lubricant port that extends through the first end wall, wherein lubricant enters and exits the cavity through the lubricant port; and
   an inflatable bladder disposed in the cavity;
   wherein a volume of lubricant in the cavity is greater when the inflatable bladder is deflated than when the inflatable bladder is inflated.

2. The axle assembly of claim 1 wherein the inflatable bladder forces lubricant out of the cavity through the lubricant port when the inflatable bladder is inflated.

3. The axle assembly of claim 2 wherein the inflatable bladder substantially fills the cavity when inflated.

4. The axle assembly of claim 1 wherein lubricant enters the cavity via the lubricant port when the inflatable bladder is deflated.

5. The axle assembly of claim 1 wherein the upper wall faces toward the differential and the inflatable bladder moves away from the upper wall when the inflatable bladder is deflated.

6. The axle assembly of claim 5 wherein an additional lubricant port extends through the upper wall.

7. The axle assembly of claim 5 wherein the inflatable bladder is disposed on the lower wall and is spaced apart from the upper wall when the inflatable bladder is deflated.

8. The axle assembly of claim 1 wherein two lubricant ports extend through the first end wall and a lubricant trough is disposed between the lubricant ports that is configured as a recess that extends from the first end wall to the upper wall.

9. The axle assembly of claim 1 wherein the axle housing has a first arm portion that extends from the center portion and that receives a first axle, wherein the lubricant port in the first end wall directs lubricant into the first arm portion when the inflatable bladder is inflated.

10. The axle assembly of claim 1 wherein the second end wall has a second lubricant port.

11. The axle assembly of claim 10 wherein the axle housing has a first arm portion that extends from the center portion and that receives a first axle, a second arm portion that is disposed opposite the first arm portion and that extends from the center portion and receives a second axle, wherein the lubricant port in the first end wall directs lubricant into the first arm portion and the second lubricant port directs lubricant into the second arm portion when the inflatable bladder is inflated.

12. The axle assembly of claim 10 wherein the body of the ballast insert assembly has a third lubricant port disposed in the upper wall between the lubricant port and the second lubricant port.

13. The axle assembly of claim 10 wherein the inflatable bladder is disposed inside the body between the lower wall and the upper wall and between the first end wall and the second end wall.

14. An axle assembly comprising:
an axle housing that has a center portion that receives a differential, wherein the center portion has a housing trench that is disposed directly below the differential and that has a first housing trench side wall, a second housing trench side wall disposed opposite the first housing trench side wall and disposed parallel to the first housing trench side wall, and a housing trench bottom wall that extends from the first housing trench side wall to the second housing trench side wall; and
a ballast insert assembly disposed in the center portion below the differential and that at least partially fills the housing trench, wherein the ballast insert assembly includes:
a body that at least partially defines a cavity and that has a lubricant port, wherein the body has a first side wall that engages the first housing trench side wall, a second side wall that engages the second housing trench side wall; and
an inflatable bladder disposed in the cavity;
wherein a volume of lubricant in the cavity is greater when the inflatable bladder is deflated than when the inflatable bladder is inflated.

15. The axle assembly of claim 14 wherein the body has a lower wall that extends from the first side wall to the second side wall and that is disposed on the housing trench bottom wall.

16. The axle assembly of claim 14 further comprising a differential carrier that rotatably supports the differential and that engages the first housing trench side wall.

17. An axle assembly comprising:
an axle housing that has a center portion that receives a differential; and
a ballast insert assembly disposed in the center portion below the differential, wherein the ballast insert assembly includes:
a body that at least partially defines a cavity and that has a lubricant port, a first side wall, a second side wall disposed opposite the first side wall, a lower wall that extends from the first side wall to the second side wall, an upper wall that is disposed opposite the lower wall and that extends from the first side wall to the second side wall, and first and second end walls that are disposed at opposite ends of the body and that extend from the first side wall to the second side wall and from the upper wall to the lower wall, wherein the first and second end walls are disposed in a non-parallel relationship; and
an inflatable bladder disposed in the cavity;
wherein a volume of lubricant in the cavity is greater when the inflatable bladder is deflated than when the inflatable bladder is inflated.

18. The axle assembly of claim 17 wherein the lubricant port is disposed in the first end wall.

19. The axle assembly of claim 17 wherein the upper wall extends along a continuous arc from the first end wall to the second end wall.

* * * * *